Dec. 2, 1924.

C. R. JOHNSON

COIN CONTROLLED GLASSES

Filed July 19, 1923

C. R. Johnson, Inventor.

Attorneys

Patented Dec. 2, 1924.

1,517,731

UNITED STATES PATENT OFFICE.

CLARENCE R. JOHNSON, OF PORTLAND, OREGON.

COIN-CONTROLLED GLASSES.

Application filed July 19, 1923. Serial No. 652,593.

*To all whom it may concern:*

Be it known that I, CLARENCE R. JOHNSON, a citizen of the United States, residing at Portland, in the county of Multnomah and State of Oregon, have invented new and useful Coin-Controlled Glasses, of which the following is a specification.

This invention relates to coin controlled glasses such as telescopes, opera glasses, field glasses and the like.

The object of the invention is to provide a glass of this character with means for securing it to a fixed support and having means for obscuring the sight thereof, said obscuring means being removable on the insertion of a coin so that the glass may be used by dropping a coin in a slot.

These glasses are designed to be placed on lookouts and other high points as well as in opera houses and the like.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:

Fig. 3 is a detail section taken on the line 3—3 of Fig. 2; and

Figure 1:
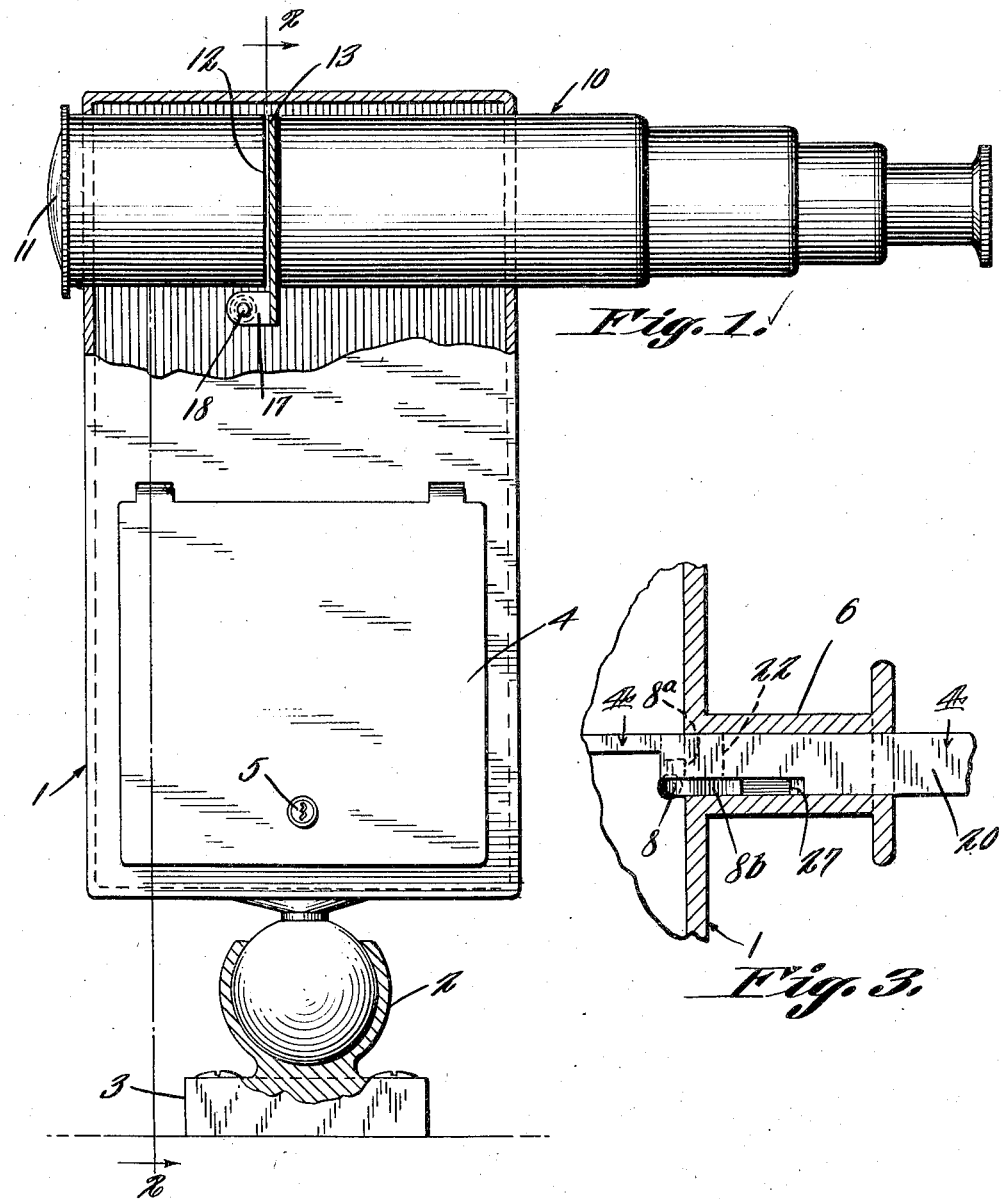
Figure 1 represents a front elevation of a casing having a telescope mounted therein parts of the casing being broken out and in section and the telescope shown in side elevation.

In the embodiment illustrated the device constituting this invention comprises a glass support and coin receiving casing 1 connected by a ball and socket joint 2 with a fixed base or support 3. This casing 1 has a door 4 secured by a key controlled lock 5 which affords access to the interior of the casing for the removal of the coin deposited and for obtaining access to the parts housed within the casing. A sleeve 6 extends laterally from the upper end of the casing 1 and has a coin slot 7 for a purpose presently to be described.

Figure 2:
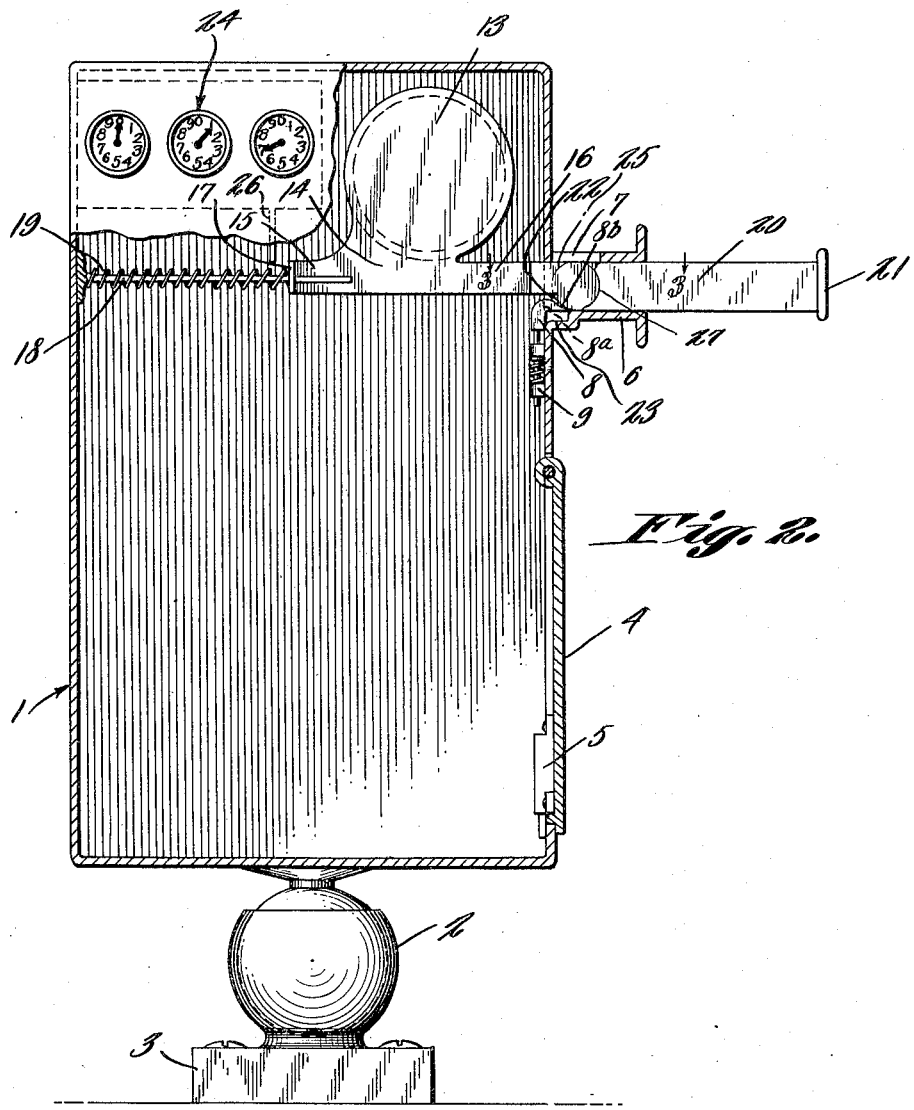
Fig. 2 is section taken on the line 2—2 of Fig. 1.
Figure 4:
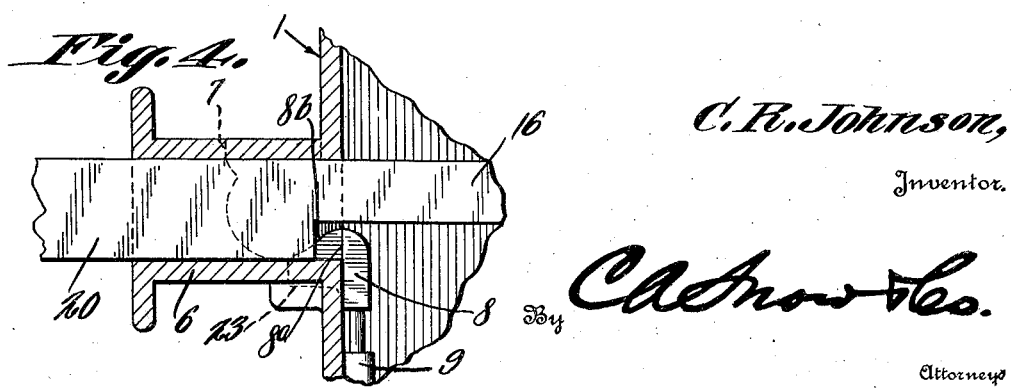
Fig. 4 is a similar view taken on the line 4—4 of Fig. 3.

A telescope 10 extends transversely through the casing 1 and is secured therein by any suitable means with the lens 11 thereof extending beyond the casing. This telescope is transversely slotted as shown at 12 and a shutter 13 is mounted to slide through said slot and is normally held in position within the telescope so as to obscure vision through the lens. This shutter 13 is carried by a plate 14 having longitudinally alined laterally extending arms 15 and 16 the arm 15 having a right angular apertured ear 17 which is slidably mounted on a rod 18 fixed to one side wall of the casing 1 and on which is arranged a coiled spring 19. This spring abuts the outer face of the ear 17 and the head of the rod 18 and exerts its tension to project the shutter in the position shown in Fig. 2 so that vision through the lens 11 is obscured. The arm 16 of the shutter carried by plate 14 merges into a plunger 20 which is slidably mounted in the sleeve 6, said sleeve and rod 18 forming guides for the plunger and the shutter. The plunger 20 projects some distance beyond the outer end of sleeve 6 and is equipped with a head 21 at its outer end and with a shoulder 22 at its junction with the arm 16, said shoulder being located in the path of a spring projected catch 8 which is mounted in suitable bearings 9 on the inner face of the casing 1 adjacent the sleeve 6. This catch 8 has a shoulder 8ª for engagement with the shoulder 22 of the plunger whereby the plunger is locked against inward movement. At the side of the shoulder 8ª the catch has a curved portion 8ᵇ which is located directly below the slot 7 in the sleeve and with which the coin 25 for actuating the device is designed to engage so that when the coin is inserted and the plunger pushed in the catch 8 will be moved against the tension of the spring and the bill thereof will drop into a recess or pocket 23 formed in the sleeve 6 and permit the plunger to pass into the casing thereby moving the shutter 13 transversely of the telescope 10 out of the slot 12 therein so as to permit unobstructed vision through the lens.

A register 24 is mounted on the casing 1 and may be of any desired construction and has a finger 26 depending into the path of the ear 17 so that when the slide 13 is moved inwardly to permit the use of the telescope the ears 17 will engage the finger 26 and operate the register so that it will show the amount of money which has been deposited in the casing 1.

It is of course understood that the plunger 20 must be held pushed in while the glass 10 is being used and immediately pressure is released on the plunger the spring 19 will project it and cause the shutter 13 to assume its normal position across the body of the telescope. When in this position the spring pressed catch 8 will be projected and engage with the shoulder 22 of the plunger and lock it against inward movement until another coin is inserted.

It is obvious that the inward movement of the plunger with the coin 25 carried thereby will cause the coin to pass into the casing and to drop off the plunger into the casing where it will remain until the door 4 is opened by an authorized person carrying the key to the lock 5.

While the invention is shown applied to a telescope obviously it may be to any other glass of this character. The ball and socket joint 2 which connects the casing 1 to a supporting structure 3 is designed to permit the casing to be swung up into any desired angle to permit the adjustment of the glass to suit the user.

The plunger 20 in addition to the shoulder 22 has a recess 27 in one side thereof of a length greater than the catch 8 and which is designed to register with the slot 7 in the sleeve 6 to receive the coin 25 actuating the apparatus, the end wall 25 of the recess 27 forming an abutment for the coin when the plunger is moved inward.

Various changes in the form, shape, proportion and other minor details of construction may be made without departing from the principle or sacrificing any of the advantages of the claimed invention.

I claim:—

1. A device of the class described comprising a casing, a telescope fixedly mounted in said casing and extending transversely therethrough, said telescope having a transverse slot therein, a shutter mounted to slide in said slot to normally obscure vision through said telescope, oppositely extending arms carried by said shutter, one of said arms merging into a plunger, guides for said arms, whereby the plunger is adapted to reciprocate to move the shutter into obstructing and unobstructing positions, a shoulder on said plunger, a spring pressed catch to engage said shoulder and lock the plunger against reciprocation, and means on said catch for engagement by a coin to release said plunger and permit the shutter to be moved out of the path of vision.

2. The combination of a casing, a telescope fixed in said casing with its lens projecting beyond the casing, said telescope having a transverse slot therein, a shutter movably mounted in said slot to normally obscure vision through the instrument, a spring projected plunger carried by said shutter, a sleeve on said casing in which said plunger operates, a spring projected catch carried by the inner face of the casing, a shoulder on the plunger for engagement by said catch to lock the plunger against reciprocation, a coin slot in said plunger, and means carried by said catch projecting into said slot for engagement by a coin to release the catch and to permit the plunger to be operated for reciprocating the shutter.

3. The combination with a casing having a sleeve extending laterally from one side wall, said sleeve having a slot in one wall and a pocket in the other, a plunger mounted to reciprocate in said sleeve and having a coin slot therein registering with the slot in the sleeve, a spring pressed catch positioned to normally engage the plunger to hold it in projected position, said catch having means located in the path of a coin whereby the catch is released on the insertion of a coin on the inward movement of the plunger, said catch being adapted to enter the pocket during this movement of the coin to permit the plunger to move freely over the catch, a shutter carried by the plunger, and a telescope located in the casing adapted to be obstructed by said shutter.

In testimony that I claim the foregoing as my own, I have hereto affixed my signature in the presence of two witnesses.

CLARENCE R. JOHNSON.

Witnesses:
 MURIEL E. JOHNSON,
 L. E. JORDAN.